United States Patent
Moctezuma et al.

(10) Patent No.: US 9,656,374 B2
(45) Date of Patent: May 23, 2017

(54) AUTOMOTIVE ASSEMBLY LINE BODY CHIP AND SCRATCH REDUCING BUMPER

(71) Applicant: FORD GLOBAL TECHNOLOGIES, LLC, Dearborn, MI (US)

(72) Inventors: Jocelyn Moctezuma, Cuautitlan (MX); Zoram Florencio, Tultepac (MX); Angel Alvarez, Nezahualcoyotl (MX)

(73) Assignee: Ford Global Technologies, LLC, Dearborn, MI (US)

( * ) Notice: Subject to any disclaimer, the term of this patent is extended or adjusted under 35 U.S.C. 154(b) by 614 days.

(21) Appl. No.: 14/156,615

(22) Filed: Jan. 16, 2014

(65) Prior Publication Data
US 2015/0198210 A1    Jul. 16, 2015

(51) Int. Cl.
*B25B 21/00*   (2006.01)
*B62B 5/06*    (2006.01)
(Continued)

(52) U.S. Cl.
CPC .............. *B25B 21/00* (2013.01); *B23B 31/02* (2013.01); *B23B 31/1179* (2013.01);
(Continued)

(58) Field of Classification Search
CPC .. F16F 1/37; F16F 2222/10; F16F 2224/0225; F16F 2226/04; F16F 2230/0023; F16F 2234/02; B23P 19/06; B25B 21/00; B25B 31/00; B29C 61/02; B29K 2023/00; B62B 5/00; B62B 5/06; B25F 5/00; B25F 5/02; B25G 1/00; B25G 1/01; B25G 1/02; B25G 1/10; G09F 3/00;
(Continued)

(56) References Cited

U.S. PATENT DOCUMENTS 3,716,433 A  *  2/1973  Plummer ................. B25G 1/00
                                                        156/213
4,390,745 A     6/1983  Boettcher et al.
(Continued)

FOREIGN PATENT DOCUMENTS

JP        2004087809 A      3/2004

OTHER PUBLICATIONS http://www.vententersearch.com/?p=868, Mar. 1, 2013, p. 1 of 8, VentEnterSearch.com—"Heat Shrink Tool Wrap", Jun. 22, 2010.
(Continued)

*Primary Examiner* — Walter B Aughenbaugh
(74) *Attorney, Agent, or Firm* — Damian Porcari; Brooks Kushman P.C.

(57) ABSTRACT

An automotive assembly line tool system and method utilizing a heat-shrinkable bumper disposed around a portion of an assembly line tool for absorbing kinetic energy between the portion of the tool and a work-piece on an assembly line. The bumper may be a chemically cross-linked polyolefin heat-shrinkable material having a shore D hardness of 42 or less after being heat-shrunk. The bumper may be a tubular bumper that has a continuous outer surface around its circumference and a heavy wall that is highly split-resistant. The bumper may have a life term of at least one year in an automotive assembly line environment. By protecting the tools and equipment, chips and scratches on a work-piece on the assembly line may be reduced.

16 Claims, 2 Drawing Sheets

(51) Int. Cl.
    *B25F 5/00*     (2006.01)
    *B25B 31/00*     (2006.01)
    *B25F 5/02*     (2006.01)
    *B25G 1/00*     (2006.01)
    *B25G 1/10*     (2006.01)
    *B25G 1/01*     (2006.01)
    *B25D 17/08*     (2006.01)
    *B23B 31/02*     (2006.01)
    *B23B 31/117*     (2006.01)
    *B25D 17/11*     (2006.01)
    *B25B 23/00*     (2006.01)
    *B23P 19/06*     (2006.01)
    *B29K 23/00*     (2006.01)
    *B29L 31/00*     (2006.01)
    *B29C 61/02*     (2006.01)
    *B29C 63/42*     (2006.01)

(52) U.S. Cl.
    CPC .............. *B25B 23/00* (2013.01); *B25B 31/00* (2013.01); *B25D 17/08* (2013.01); *B25D 17/11* (2013.01); *B25F 5/00* (2013.01); *B25F 5/02* (2013.01); *B25G 1/00* (2013.01); *B25G 1/01* (2013.01); *B25G 1/10* (2013.01); *B62B 5/06* (2013.01); *B23P 19/06* (2013.01); *B23P 2700/50* (2013.01); *B29C 61/025* (2013.01); *B29C 63/42* (2013.01); *B29K 2023/00* (2013.01); *B29L 2031/7502* (2013.01); *F16F 2230/0023* (2013.01); *F16F 2234/02* (2013.01); *Y10T 428/139* (2015.01); *Y10T 428/1328* (2015.01); *Y10T 428/1331* (2015.01)

(58) Field of Classification Search
    CPC ........... Y10T 428/139; Y10T 428/1393; Y10T 428/1328; Y10T 428/1331; B25D 17/08; B25D 17/11; B23B 31/02; B23B 31/1179
    See application file for complete search history.

(56) References Cited

U.S. PATENT DOCUMENTS

| | | | |
|---|---|---|---|
| 4,509,820 A | 4/1985 | Murata et al. | |
| 5,189,267 A * | 2/1993 | Ligman | B25F 5/00 |
| | | | 181/230 |
| 5,319,522 A | 6/1994 | Mehta | |
| 5,661,842 A | 8/1997 | Faust | |
| 5,722,672 A * | 3/1998 | Frederick | B62B 5/06 |
| | | | 150/154 |
| 5,855,376 A * | 1/1999 | Lillbacka | B23B 31/02 |
| | | | 279/133 |
| 6,156,140 A | 12/2000 | Ayres | |
| 7,959,387 B2 * | 6/2011 | Frota de Souza | B23B 31/02 |
| | | | 279/103 |
| 2006/0252573 A1 | 11/2006 | Fenimore et al. | |
| 2008/0271833 A1 * | 11/2008 | Tennant | G09F 3/00 |
| | | | 156/85 |
| 2013/0032273 A1 | 2/2013 | Homma | |

OTHER PUBLICATIONS

3M Heavy Wall Heat Shrink Tubing ITCSN Data Sheet, Sep. 2013, pp. 1-4.

* cited by examiner

AUTOMOTIVE ASSEMBLY LINE BODY CHIP AND SCRATCH REDUCING BUMPER

TECHNICAL FIELD

This disclosure relates to the covering of assembly line tooling with a bumper to protect assembly line work-pieces from contact by the tooling that may have chipped or scratched paint on the work-piece had there been no bumper, and to the bumper being that of a material and construction that allows for longevity in the assembly line environment as well as ease of application.

BACKGROUND

An assembly line is a physical space in a manufacturing process in which parts are added to a product in a sequential manner to create a finished product. A manufacturing process which uses an assembly line is sometimes referred to as a progressive assembly process. Assembly lines are designed for the sequential organization of workers and/or robots operating tools for the combination of, modification of, or enhancements of, parts or work-pieces on the assembly line on a station-by-station basis. An assembly line is often much faster than individually handcrafting each product from start to finish when manufacturing a large number of products, and often with more controlled quality and uniformity. The motion of workers is minimized to the extent possible, and most parts or assemblies are handled either by conveyors or motorized vehicles, or gravity, with little manual trucking.

Henry Ford is often attributed with the early success of the Assembly line with the production of the Model T automobile. In My Life and Work, a book written by Henry Ford in collaboration with Samuel Crowther and published by Garden City Publishing in 1922, Henry Ford states that the principles of assembly are these: "(1) Place the tools and the men in the sequence of the operation so that each component part shall travel the least possible distance while in the process of finishing. (2) Use work slides or some other form of carrier so that when a workman completes his operation, he drops the part always in the same place—which place must always be the most convenient place to his hand—and if possible have gravity carry the part to the next workman for his operation. (3) Use sliding assembling lines by which the parts to be assembled are delivered at convenient distances."

Even with the tools and men in sequence so that the parts travel the least distance, use of work slides and carriers so the part is always in the same place, and using of convenient distances, tools and equipment on the assembly line may still contact the parts and work-pieces on the assembly line. When a tool, part, or piece of equipment contacts a painted surface of a work-piece on the assembly line a chip or scratch may occur. This paint damage may require additional processing at the end of the assembly line to repair the chip or scratch.

SUMMARY

One aspect of this disclosure is directed to an automotive assembly line tool system having a heat-shrinkable tubular bumper disposed around a portion of an assembly line tool for absorbing kinetic energy between the portion of the tool and a work-piece on an assembly line. In this aspect, the bumper may have a shore D hardness of 42 or less. The bumper may also be a chemically cross-linked polyolefin. The bumper may have a radial shrink reduction of a quarter its original size with substantially no longitudinal reduction, such that the bumper may be cut to length, disposed over an area on a tool or piece of equipment and heat-shrunk over the portion of the tool or piece of equipment that may contact work-pieces on the assembly line. By protecting the tools and equipment, chips and scratches on a work-piece on the assembly line may be reduced.

In this aspect, the tool may be a cart for delivering parts to the assembly line and the portion of the tool covered may be a handle on the cart. Another example may be when the tool is a pneumatic tool for running nuts or bolts to assemble components to, or proximate, the painted work-piece, and the portion of the tool covered is a drive shaft of the pneumatic tool for the nuts or bolts. The work-piece may be painted and the absorbing of the kinetic energy between the tool and work-piece may reduce occurrence of chips and scratches on the paint.

According to another aspect of this disclosure, a method for reducing scratches on a painted work-piece on an assembly line is disclosed. The method comprises determining a contact location on assembly line tooling where the assembly line tooling contacts a work-piece, selecting a heat-shrinkable tubular material disposable to cover the contact location, cutting to length and disposing the material over the contact location, and heat-shrinking the material around the work-piece and over the contact location to provide a bumper between the assembly line tooling and the work-piece.

In the disclosed method, an adhesive may be activated between the material and the portion of the assembly line tooling. The material after heat-shrinking may have a shore D hardness of 42 or less. The material may be selected such that it may have a life term of one year or more in a painted work-piece assembly line environment. The painted work-piece assembly line environment may be such that tape only has a life term of approximately one week. The material chosen may also be a polyolefin.

According to a further aspect, an assembly line tool having a tubular heat-shrinkable bumper having a Shore D Hardness of 42 or less disposed over and heat-shrunk onto a portion of the tool that is prone to contact a painted automotive body panel on an automotive assembly line is shown. The tool may have a tubular bumper with a heavy wall that is highly split-resistant. The tool may have a tubular bumper that has a continuous outer surface around a circumference of the tubular bumper. The tool may have a tubular bumper that has a life term of one year or more on the portion of the tool in an automotive assembly line environment.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
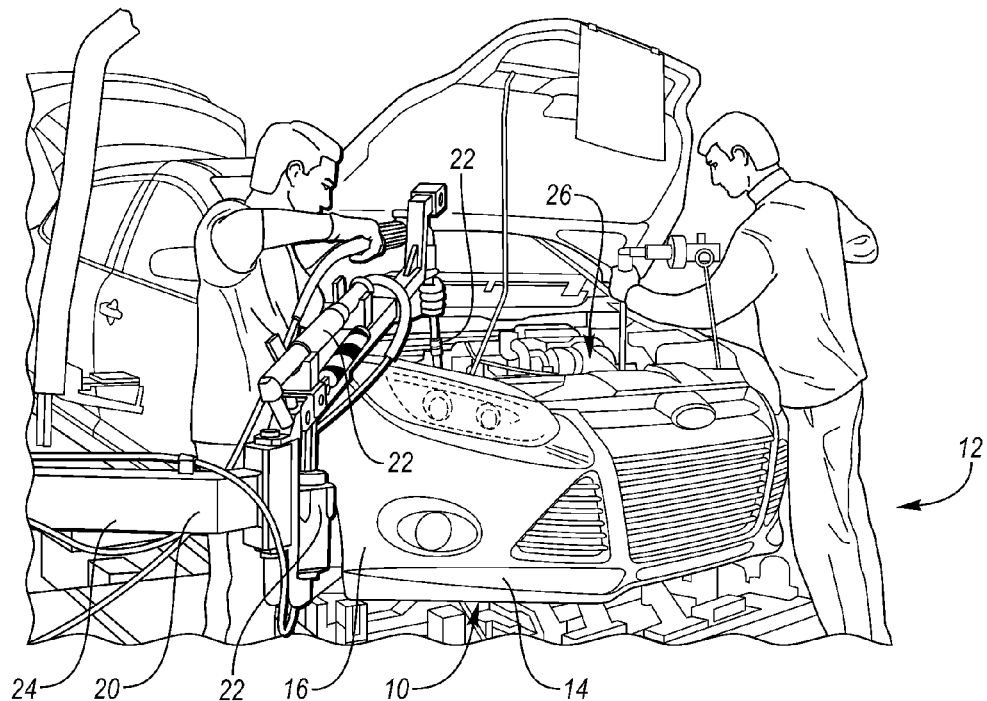
FIG. 1 is a perspective view of a work-piece and a tool on an assembly line.

FIG. 1 shows a work-piece 10 on an assembly line 12. In this case, the work-piece 10 is an automobile 14 having painted body panels 16. An assembly line tool 20 is shown in close proximity with the work-piece on the assembly line 12. The tool 20 may have a portion that may come in contact with the work-piece 10 during normal assembly operations. This portion may be referred to as a contact location 22 on the tool 20 and may be a portion of the tool 20 that is prone to contact a painted automotive body panel 16. A tool 20 may have multiple contact locations 22. The tool 20 is shown here as a pneumatic tool 24 for running nuts or bolts. The pneumatic tool 24 may be used to run nuts or bolts to assemble components to or proximate the work-piece 10. The pneumatic tool 24 shown here runs nuts to assemble a component inside an engine compartment 26, proximate a painted body panel 16. Another non-limiting example of a tool 20 that may have a contact location 22 is that of a cart for delivering parts (not shown). In this example, a handle on the cart may be the portion of the tool 20 most prone to contact with the work-piece.

Figure 2:
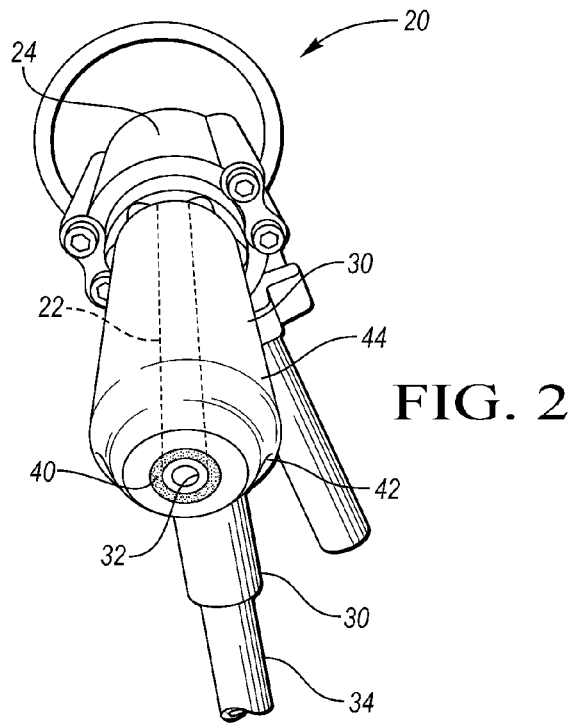
FIG. 2 is a perspective view of an assembly line tool with a bumper.

FIG. 2 shows an assembly line tool 20 having at least one bumper 30 disposed around a portion of an assembly line tool 20. The bumper 30 may be disposed over the previous contact location 22 of the tool 20 that may have contacted a work-piece 10 (see FIG. 1) before being covered with the bumper 30. One such contact location 22 of the tool 20 shown here is the drive shaft 32 of a pneumatic tool 24. Another such contact location 22 may be an extension arm 34 of the pneumatic tool 24. The tool 20 may be hand operated, as the device shown is intended to be used, or may be robotically driven (not shown). Even with precise robotic maneuvering of the tool 20 contact with a work-piece 10 may still occur.

The bumper 30 is a heat-shrinkable tubular bumper which may be cut to length, disposed over the contact location 22, and heat-shrunk into position. The bumper 30 is configured to absorb kinetic energy between the contact location 22 and the work-piece 10 in case contact were to occur. When the bumper 30 absorbs the kinetic energy between the tool 20 and the work-piece 10, the bumper 30 significantly reduces occurrences of chips and scratches. The bumper 30 requires a shore D hardness of 42 or less to be able to provide optimal kinetic energy absorption, however other hardness levels may be used with varying results in chip and/or scratch reduction.

The bumper 30 may be a chemically cross-linked tubular polyolefin with a radial shrink reduction of a quarter its original size with substantially no longitudinal reduction. This allows for the bumper 30 to be easily cut to length (cut to the length of the contact location 22 on the tool 20), and slipped over the contact location 22, as the diameter may be 4 times larger than the diameter of the contact location 22, and then heat-shrunk into position. The heat-shrinking of the bumper 30, along with its elastic qualities, provides a form fit around the contact location 22. An adhesive 40 may also be applied between the bumper 30 and the contact location 22.

The tubular bumper 30 may have a heavy wall 42 that is highly split-resistant. The tubular bumper 30 may also have a continuous outer surface 44 around its circumference. The bumper 30 is designed to have a life term of one year or more on the contact location 22 of the tool 20 in an automotive assembly line environment. An automotive assembly line environment is one in which tape only has a life term of approximately one week in the same environment.

Figure 3:
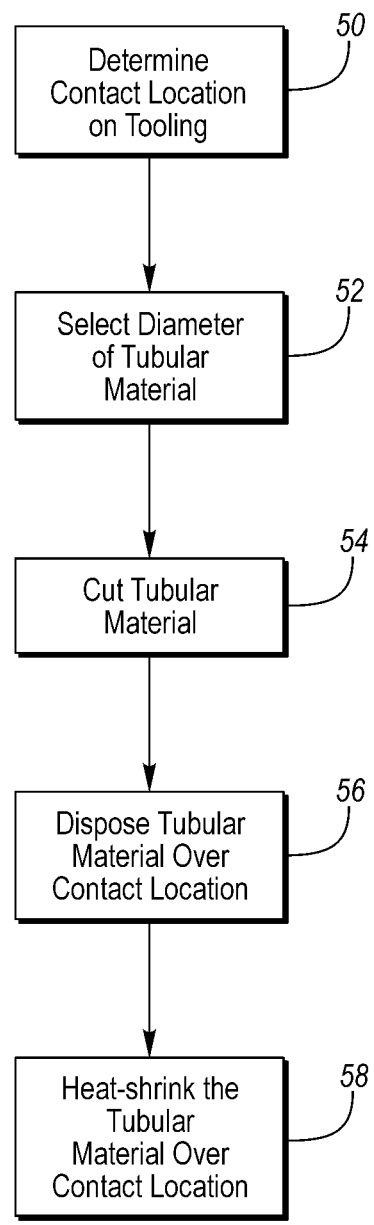
FIG. 3 is a flow chart of a method for reducing scratches on a painted work-piece on an assembly line by disposing a heat-shrinkable tubular material over a contact location on an assembly line tool to provide a bumper between the assembly line tool and the work-piece.

FIG. 3 shows a flow chart of a method for reducing scratches on a painted work-piece on an assembly line. The first step 50 shown here is to determine a contact location on assembly line tooling. The contact location is one where the assembly line tooling potentially contacts a work-piece. Step 52 shows to select a diameter of tubular material that is disposable over the contact location. The tubular material is a heat-shrinkable tubular material, and selecting one with a diameter large enough to fit around the contact location of the tooling allows for the easy positioning of the tubular material to cover the contact location.

At step 54, the tubular material is cut. The heat-shrinkable tubular material may have a radial shrink reduction of a quarter its original size with substantially no longitudinal reduction. Since it has substantially no longitudinal reduction, the tubular material may be cut to substantially the same length as the contact area on the tooling. At step 56, the tubular material is disposed over the contact location.

At step 58, the tubular material is heat-shrunk on to the contact location. The tubular material provides a bumper between the assembly line tooling contact location and the work-piece on the assembly line once it is heat-shrunk into position. The elasticity of the tubular heat-shrinking material may provide enough forces to hold the bumper in position; however, step 58 may also include activating an adhesive between the material and the portion of the assembly line tooling. The adhesive may be heat activated at a similar temperature needed to active the shrinking effect of the heat-shrinkable material. The adhesive may be located on the inside of the tubular material. The adhesive may also be applied directly to the contact location of the tooling after determining the contact location.

In this shown method, the material may be a polyolefin having an after heat-shrunk shore D hardness of 42 or less for optimal performance. As well, the material may have a life term of at least one year in a painted work-piece assembly line environment. The painted work-piece assembly line environment may be such that tape applied to the contact locations of the tooling may only have a life term of approximately one week. Tapes cannot not provide a shore D hardness of 42 or less.

Examples of a heat-shrinkable tubular materials capable of delivering some of the desired attributes as described above are 3M heavy wall heat-shrink tubing product numbers ITCSN-1500, ITCSN-3000, and ITCSN-4300. The 3M material is designed for electrical performance and may be repurposed to provide the desired attributes. The implementation of the aspects disclosed above may be used to reduce chip and/or scratch occurrence on painted automobile body panels on an assembly line by over 70%. The implementation of the aspects disclosed above have reduced the chip and scratch occurrences on automobile doors and body side panels of the Ford Fiesta by 85% through the Trim, Chassis, Final and EOL segments of the assembly line at the Ford Cuautitlan Stamping and Assembly Plant (CSAP) located in Cuautitlan Izcalli, Mexico.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An automotive assembly line tooling system comprising:
   a body portion;
   a driveshaft extending from and external to the body portion; and
   a heat-shrinkable tubular bumper disposed around the driveshaft, the bumper alone surrounding the driveshaft.

2. The system of claim 1 wherein the bumper has a shore D hardness of less than 42.

3. The system of claim 1 wherein the bumper is a chemically cross-linked polyolefin.

4. The system of claim 1 wherein the bumper has a radial shrink reduction of a quarter its original size with substantially no longitudinal reduction.

5. The system of claim 1 wherein the tooling system is a pneumatic tool system for running nuts or bolts to assemble components to or proximate a work-piece.

6. The system of claim 1, wherein the driveshaft is non-parallel with the body portion.

7. The system of claim 1 further comprising an extension arm extending from and external to the body portion, wherein a second heat-shrinkable tubular bumper is disposed around the extension arm.

8. The system of claim 7, wherein the extension arm is non-parallel with the body portion.

9. The system of claim 1, wherein the body portion is secured to a robot.

10. An automotive assembly line tool comprising:
    a body portion;
    an extension arm extending from and external to the body portion;
    a first tubular heat-shrinkable bumper disposed over and heat-shrunk directly onto the extension arm;
    a driveshaft extending from and external to the body portion; and
    a second tubular heat-shrinkable bumper alone disposed around the driveshaft.

11. The tool of claim 10 wherein the first tubular heat-shrinkable bumper has a continuous outer surface around a circumference of the first tubular heat-shrinkable bumper.

12. The tool of claim 10 wherein the first tubular heat-shrinkable bumper has a life term of one year or more on the tool in an automotive assembly line environment.

13. The tool of claim 10, wherein the extension arm is non-parallel with the body portion.

14. The tool of claim 10, wherein the driveshaft is non-parallel with the body portion.

15. The tool of claim 10, wherein the body portion is secured to a robot.

16. The tool of claim 10, wherein the first tubular heat-shrinkable bumper has a shore D hardness of less than 42.

* * * * *